July 11, 1961  P. T. KAESTNER ET AL  2,992,334
FOLLOW-UP OR MOTION DUPLICATING SYSTEMS Filed June 6, 1958  3 Sheets-Sheet 1

INVENTORS
PAUL T. KAESTNER
RALPH H. WIGHT
BY
Louis L. Gagnon
ATTORNEY

United States Patent Office 2,992,334
Patented July 11, 1961

1

2,992,334
FOLLOW-UP OR MOTION DUPLICATING SYSTEMS
Paul T. Kaestner and Ralph H. Wight, Pittsburgh, Pa., assignors to J. W. Fecker, Inc., Pittsburgh, Pa., a corporation of Pennsylvania
Filed June 6, 1958, Ser. No. 740,367
15 Claims. (Cl. 250—201)

This invention relates to electro-optical motion follow-up or duplicating systems and has particular reference to improved means and method for following up or duplicating, at a first location, motions which are produced at a location remote from said first location.

A principal object of this invention is to provide improved precision means and method for accurately and substantially instantaneously following-up or duplicating at one location, motions which are produced at remote locations.

Another object is to provide an electro-optical device embodying spaced movable operating parts which are adapted to function cooperatively without being physically interconnected to duplicate at one of said parts, motions which are produced at the other of said parts.

Another object is to provide in a device of the above character novel means and method for electro-optically modulating light energy in accordance with the extent and direction of motions produced by a first motion imparting means at one location and simultaneously directing said modulated light energy toward a second remote location, electro-optically interpreting said modulated light energy at said remote location and converting said modulated light energy into electrical energy capable of operating a second motion imparting means in such a manner as to cause said second motion imparting means to duplicate the motions produced by said first motion imparting means.

Another object is to provide novel means and method for maintaining a predetermined part of a movable member in accurate aligned relation at all times with a location while said movable member is in motion relative to said location.

Another object is to provide an electro-optical system embodying a pair of motion imparting members spaced relative to each other and disposed in optically aligned relation with each other, means in one of said members for projecting light energy to the other of said members and for modulating said light energy in accordance with motions imparted to said one of said members, means in the other of said members for receiving said modulated light energy and converting the same to electrical energy having characteristics controlled in accordance with the modulation of said light energy and means operated by said electrical energy for producing motion which duplicates said motion imparted to said one of said members.

Other objects and advantages of the invention will become apparent from the following description when taken in conjunction with the accompanying drawings in which.

Figure 1:
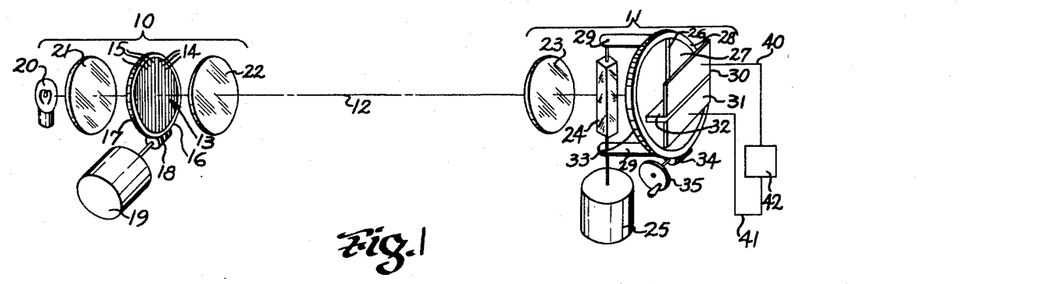
FIG. 1 is a perspective diagrammatic illustration of one of the basic embodiments of the invention.

Referring more particularly to the drawings wherein like characters of reference designate like parts throughout the various views, there is diagrammatically shown in FIG. 1 an embodiment of the invention which comprises a pair of units 10 and 11 remotely spaced from each other along an optical axis 12. The unit 10 comprises a rotatable grid 13 having its general plane disposed in substantially normal relation to the direction of the axis 12. The grid 13 embodies a plurality of alternate equally spaced parallel opaque and transparent lines or strips 14 and 15 respectively and may be formed of a photographic film material or the like which has been exposed and processed in a known manner to produce the alternate opaque and transparent areas or may be formed of a plurality of equally spaced parallel wires or the like whereby light will be permitted to pass only between the wires when directed through the grid 13. A framework 16 is provided to support the grid 13 in such a manner as to cause the optical axis 12 to pass substantially centrally through the grid 13.

In order to rotate the grid 13 about the optical axis 12 there is provided on the frame 16, a ring gear or the like 17 which meshes with a worm gear 18 attached to and driven by a motor or the like 19 or other suitable drive means may be employed.

Light is projected through the grid 13 from a source of illumination 20 having a conventional condensing lens 21 disposed forwardly thereof and the grid image thus formed is collimated by a conventional collimating lens or system 22 and thereby projected toward the unit 11 along paths which are parallel to the axis 12. Upon reaching the unit 11 the grid image is received by an objective lens 23 and directed through an elongated rectangular shaped scanning prism 24 which is rotatable about its longitudinal axis and driven by a motor 25. Having passed through the prism 25, the grid image is focused by the objective lens 23 at a slit 26 provided in an opaque plate-like member 27. The general plane of the opaque member 27 is disposed at the focal plane of lens 23 in normal relation to the axis 12 as illustrated and is supported in a framework 28 to which is attached a pair of brackets 29. The prism 24 is rotatably mounted between the brackets 29 with its longitudinal axis in intersecting relation with the axis 12 and disposed parallel to the slit 26. At the opposite side of the opaque member 27 there is provided a pair of photosensitive elements 30 and 31 which are separated by a dividing member 32 which intersects the axis 12 and locates said elements 30 and 31 respectively above and below said axis so as to cause the grid image passing through the slit 26 to be split by the dividing member 32 whereby, one part of the grid image will excite the photosensitive element 30 and another part thereof will simultaneously excite the photosensitive element 31. The framework 28 is provided with suitable drive means such as a ring gear 33 about its periphery in meshed relation with a worm gear 34 which is driven manually by a hand crank 35 or may alternatively be driven automatically by a suitable electric motor or the like (not shown) in a manner to be presently described. Thus, it can be seen that by driving the worm gear 34 either manually or automatically, the entire assembly including the prism 24, motor 25, opaque member 27 and photosensitive elements 30 and 31 will be simultaneously rotated about the axis 12 as a unit.

It will be noted that there are no physical connections between the units 10 and 11 of the device of FIG. 1.

However, the units 10 and 11 must be maintained in optical alignment with each other by the use of any known supporting means not shown. It should be understood, however, that while the units 10 and 11 have been illustrated as being optically aligned along a common axis 12 it is possible to displace the units relative to each other by providing an irregularly shaped optical path between the units 10 and 11 by the use of conventional mirrors and/or prisms or the like in a well known manner whereby the optical alignment of the units will not be disturbed when so displaced.

In operation, the device of FIG. 1 functions as follows:

Light is directed through the grid 13 and forms a grid image which is collimated by lens 22 and received by lens 23. The grid image then passes through the prism 24 and is focused at the slit 26 by the lens 23, whereupon the light energy which passes through the slit 26 is divided as described above so as to excite both of the photosensitive elements 30 and 31. The elements 30 and 31 may be of any of the well known types of photosensitive devices which are adapted to convert light energy to electrical energy.

Figure 2:
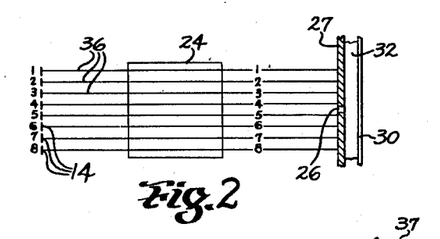
FIGS. 2, 3 and 4 are diagrammatic illustrations of the refracting effect produced upon image forming light rays when passed through one of the rotary prism parts of the optical systems of the devices of the invention.
Figure 3:
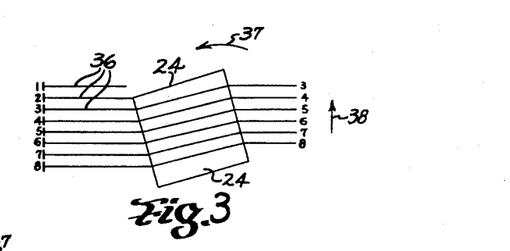
Figure 4:
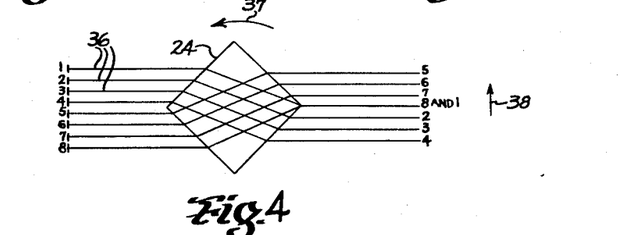

In order to cause the elements 30 and 31 to produce an alternating current, however, the light energy to which the elements 30 and 31 are exposed must be of an intermittent nature and thus, the grid image is caused to scan the slit 26 in a direction normal to its length by operation of the rotatable prism 24 as diagrammatically illustrated in FIGS. 2 through 4 wherein top plan views of the prism 24 are shown. For purposes of illustration, a few of the lines or opaque strips 14 of the grid 13 have been diagrammatically shown and numbered 1 through 8 at the extreme left of the illustrations of FIGS. 2–4 and the lines 36 emanating therefrom illustrate the projected paths of their respective images. With the prism 24 in a position such as shown in FIG. 2, it can be seen that substantially no refraction of the image-forming lines 36 passing through said prism will take place. Thus, the image of lines 14 will appear in the same order (1 through 8) when projected through the prism 24 and received at the plane of the opaque member 27. However, as prism 24 is rotated in the direction of arrow 37, FIG. 3, the image-forming lines 36 will be refracted by said prism so as to cause the images of the strips 14 to be moved laterally in the direction indicated by arrow 38. Further rotation of prism 24, then causes the images of strips 14 to move further in the direction of arrow 38 and when revolved 45°, to the position of FIG. 4, the images will assume a related position indicated by 5, 6, 7, 8 and 1 combined, and 2, 3, 4 as illustrated. Rotation of prism 24, throughout another 45° will cause the images of the strips 14 to again assume the related positions 1 through 8 as shown in FIG. 2. Continued rotation of prism 24 will cause the above cycle to be repeated over and over again to bring about the above-mentioned effect of moving the images laterally in the direction of the rotation of prism 24 as indicated by the arrow 38.

With the prism 24 in operation as just described the slit 26 will be scanned by the grid image and will cause the intermittent light passing through the slit 26 to excite both of the photosensitive elements 30 and 31 and cause them to each produce alternating electric currents, the voltages of which alternate at frequencies in accordance with the rate of scanning produced by the prism 24. When the slit 26 is disposed parallel to the direction in which the lines of the grid image extend, the voltages produced by the photosensitive elements 30 and 31 will be exactly in phase with each other since each individual image of the lines 14 will scan each of the photosensitive elements at substantially the same instant. If, however, the grid 13 is misaligned or so rotated relative to the slit 26 as to cause the lines of the grid image to be angularly disposed relative to the direction of the slit 26, an out of phase condition will exist between the voltages produced by the photosensitive elements 30 and 31. This out-of-phase condition is, of course, the result of each successive grid image line being split into two parts by the divider 32 upon passing through the slit 26 and due to the off-angular relationship of the image lines with the slit, as mentioned, one-half of each image line will excite its respective adjacent photosensitive element at a different time interval than the time at which the second half of the same image line will excite its respective photosensitive element thus causing the voltages produced by the photosensitive elements to be accordingly out of phase.

By electrically connecting each of the photosensitive elements by leads 40 and 41 to an indicating means 42 which is adapted to register any out-of-phase condition between the voltages received from each of the elements 30 and 31, means will be provided for indicating the extent of rotation of the hand crank 35 which is required to align the slit 26 parallel with the grid image lines and thus cause the voltages to become in phase with each other.

From the above, it can be seen that rotational motion of the grid 13 will cause the voltages produced by the photosensitive elements to become out of phase with each other and that by rotating the slit 26 by operation of handle 35 an amount to duplicate the rotational motion of the grid, the voltages will be brought into phase with each other.

By replacing the indicating means 42 with a phase sensitive electric motor and connecting the drive shaft of the motor directly to the worm gear 34, automatic response to the rotation of the grid 13 may be accomplished to cause the opaque member 27 to substantially instantaneously follow-up and duplicate rotational movement imparted to grid 13.

It can be seen that the device of FIG. 1 provides means embodying a pair of units 10 and 11 which are optically coaxially aligned relative to each other for following-up and duplicating motions imparted to mechanism in one of said units by mechanism in the other of said units.

In certain applications of use, however, it may be desirable to arrange a pair of units such as 10 and 11 in spaced relation with each other and having their individual axes of rotation parallel to each other rather than coaxial. Such an arrangement would require a modification of the apparatus shown in FIG. 1 and for this reason, there is illustrated diagrammatically in FIG. 5 a system embodying a pair of operating units 43 and 44 having their respective axes of rotation in spaced parallel relation with each other and each intersecting a common optical axis 45.

Figure 5:
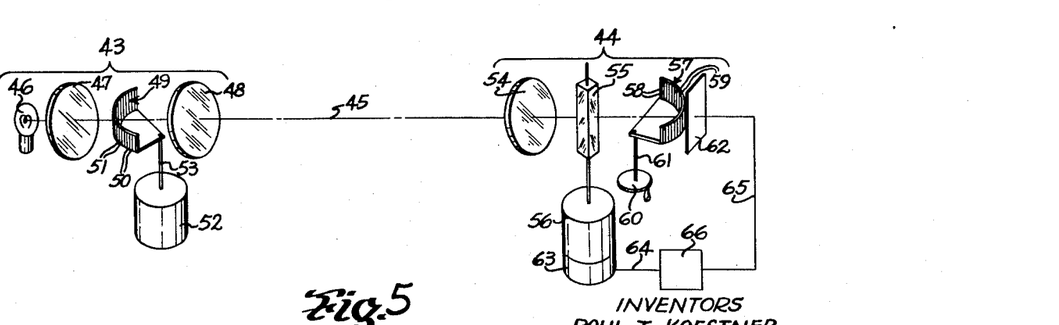
FIG. 5 is a perspective diagrammatic illustration of another embodiment of the invention.

The device of FIG. 5, which in principle is similar to the device of FIG. 1, embodies a unit 43 having a light source 46, condenser lens 47 and collimating lens 48 which are identical to the corresponding elements of FIG. 1. Between the lenses 47 and 48, however, there is provided a cylindrically shaped grid 49 having alternate opaque and transparent lines or strips 50 and 51 which are similar to the lines and spaces 14 and 15 of the grid 13 described hereinabove. The grid 14 may be formed in accordance with the disclosure given above for grid 13 and a drive motor 52 having a drive shaft 53 extending along an axis parallel to the direction of the lines 50 is connected to the grid 49, as illustrated, to rotate the same about its axis of curvature.

The light receiving end or unit 44 of the device of FIG. 5 embodies an objective lens 54 and prism 55 which are identical to the corresponding elements 23 and 24 of FIG. 1. The prism 55 is disposed with its longitudinal axis in intersecting relation with the optical axis 45 and aligned parallel to the axis of rotation of the grid 49. A drive motor 56 is provided to rotate prism 55 about its longitudinal axis. A second grid 57 which is identical to grid 49 is placed behind the prism 54 at a location such as to intersect the optical axis at a location thereon in the focal plane of lens 54. The second grid 57 is provided with opaque and transparent lines or strips 58 and 59 respectively which are identical to those of grid 49 and disposed in normal relation to axis 45 while being in parallel relation with the lines or strips 50 and 51 of grid 49. The grid 57 is rotatable about its axis of curvature by means of a manually operable hand crank 60 and shaft 61 the axis of which intersects axis 45 and is parallel to the longitudinal axis of the prism 55.

The device of FIG. 5 functions as follows:

Light from the source 46 is projected through the grid 49 to produce a grid image which is collimated by lens 48 and axis 45 to the unit 44. The objective lens 54 of the unit 44 receives the grid image and directs the same through prism 54 to its focal plane at the second grid 57. The prism 55 is rotated by motor 56 to cause the grid image to scan the second grid 57 in the manner described hereinabove for prism 24 of FIG. 1 and illustrated in FIGS. 2–4 and a photosensitive element 62 is positioned directly behind the second grid 57 to receive the intermittent light which is passed through the second grid 57 by the scanning action of the prism 55 and to convert said light into alternating electric current of a frequency controlled in accordance with the rate of scanning of the second grid by the above mentioned grid image. A tachometer or the like 63 is provided on the motor 56 to generate a standard reference voltage of a frequency also controlled in accordance with the rate of scanning produced by the rotation of the prism 55 and the voltages from the tachometer 63 and photosensitive element 62 are fed by electrical connections 64 and 65 into electronic interpreting means 66 by which a comparison of the phase relationships of the two voltages may be made. It can then be seen that with the grids 49 and 57 being held stationary, the voltage produced by the photosensitive element 62 will be in phase with the voltage produced by the tachometer 63. However, when the grid 49 is moved by the operation of motor 52, the motion thus introduced into the grid image will, when combined with the scanning motion produced by the prism 55, cause a change in the phase of the voltage produced by the photosensitive element 62 which, when compared with the standard reference voltage from the tachometer, wil be indicated on the interpreting means 66. Thus, by rotating the second grid 57 by operation of handle 60 an amount equal to the extent of original movement of the grid 49, the voltages from the photosensitive element 62 and the tachometer may again be brought into phase with each other.

From the above, it is evident that the device of FIG. 5 as well as that of FIG. 1 provides means for accurately following-up and duplicating at one of its units, motions which are introduced at the other of its units although, in both of the above devices there is no physical connection between their respective units.

It should be understood that the device of FIG. 5 may be instrumented to operate automatically by replacing the handle 60 with a phase sensitive type of electric motor and connecting the electrical output of both the tachometer 63 and the photosensitive element 62 directly to the phase sensitive motor.

It should also be clear that in the device of FIG. 1, the opaque member 27 having slit 26 may be replaced by a grid similar to grid 14. That is, wherever slits are shown in the drawings, grids may be substituted therefor. Properly spaced grids at the light receiving ends of the devices will produce multiple images at their respective photosensitive elements and thus result in stronger signals.

Figure 6:
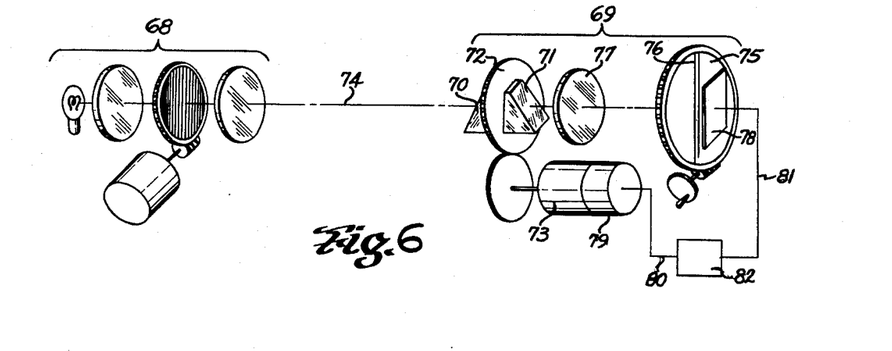
FIG. 6 is a perspective diagrammatic illustration of a modified form of the embodiments shown in FIGS. 1 and 5.

In FIG. 6 there is illustrated a further modified form of motion follow-up or duplicating means of the invention. The device of FIG. 6 is somewhat similar to the device of FIG. 1 in that the unit 68 thereof is identical in construction and function to the unit 10 of FIG. 1. The scanning means or means for imparting motion to the grid image, however, in the unit 69 of FIG. 6, is comprised of a pair of prisms 70 and 71 in back-to-back relation with each other and with their bases disposed in the same direction as illustrated. The prisms 70 and 71 are mounted on a rotatable member 72 which is geared or otherwise driven by a constant speed motor 73 which causes the prisms 70 and 71 to be rotated about the optical axis 74 of the device. An opaque member 75 having a diametrically disposed slit 76 is provided at the focal plane of an objective lens 77 to receive the grid image passing through the prisms 70 and 71 and a photosensitive element 78 behind the opaque member 75 converts the light from the grid image which scans the slit 76 into alternating electrical energy having a voltage frequency controlled in accordance with the rate of scanning of the grid image which is introduced by the rotation of prisms 70 and 71. A tachometer or the like 79 is operated by the motor 73 to provide a reference electric voltage also of a frequency determined by the rate of scanning of the grid image by the prisms 70 and 71 and the voltages are directed by leads 80 and 81 to suitable electronic interpreting and indicating means 82 for determining the phase relationship of said voltages. When the lines of the grid image are parallel to the slit 76, the two voltages will be in phase with each other and when the grid image is angularly related with the slit 76 the voltage from the photoelectric element 78 will be phase shifted relative to the reference voltage from the tachometer 79. When a phase difference between the two voltages results the slit 76 may be aligned manually or automatically to again bring the voltages in phase with each other by means and method described in detail hereinabove with regard to the devices of FIGS. 1 and 5.

It should be appreciated that various combinations of the devices thus far described are possible. In addition, the light paths between the units of the respective devices may be routed through various angles by the use of mirrors and/or prisms or the like to provide an infinite variety of relative positions for the transmitting and receiving units.

Figure 7:
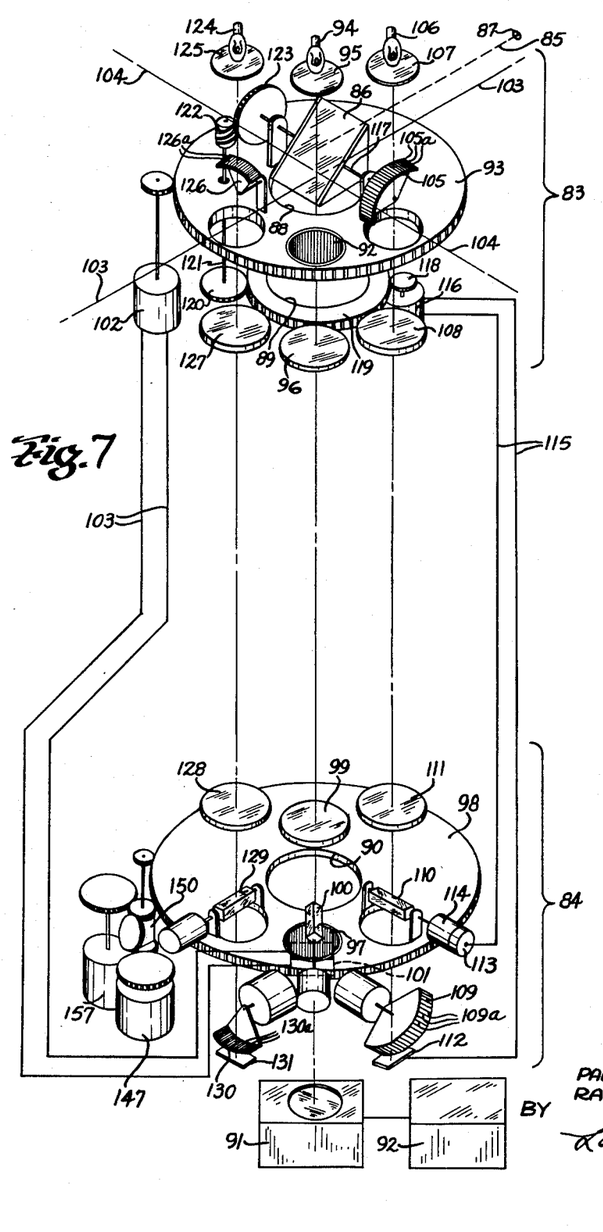
FIG. 7 is a perspective diagrammatic illustration of a device in which the embodiments of the invention shown in FIGS. 1 and 5 are arranged to function cooperatively.

In FIG. 7, there is shown diagrammatically, a device which employs the comibned use of motion follow-up or duplicating systems such as shown in FIGS. 1 and 5 and described above.

An arrangement such as shown in FIG. 7 may be used to maintain an aiming on an object moving an any direction in space rather than moving in a single plane as would be the case of either of the devices of FIGS. 1 or 5 when used separately.

In the system of FIG. 7 there is provided a pair of spaced operating units 83 and 84 which for purposes of illustration, have been designed to produce an aiming direction which is established by a "line-of-sight" (indicated by dot-dash line 85) of an elevation prism 86 on the unit 83. The prism 86 functions to bring light into the system from a target, such as illustrated by the dot 87, by directing the light traveling along the "line-of-sight" 85 downwardly, centrally through the spaces 88, 89 and 90 provided at the center of the units 83 and 84. The light from the target enters a suitable optical receiving system of a conventional type which is diagrammatically illustrated as 91. From this optical receiving system, and a cooperatively functioning range finding, azimuth, and elevation computing means 92 also of a conventional type such, for example, as used in fire control systems or similar devices, electrical information is fed to the device of FIG. 7 embodying the invention in a manner which will be discussed hereinafter to maintain the "line-of-sight" 85 of the prism 86 directed toward the target 87 at all times regardless of whether the target is stationary or moving relative to the device of FIG. 7.

A control system such as has been described thus far, is well known and its instrumentation needs no further description herein since the novel features of the device of the invention (FIG. 7) lie in the specific means, embodying a combination of the basic devices of FIGS. 1 and 4, for maintaining the prism "line-of-sight" 85 on the target 87 at all times even though there may be relative movement between the units 83 and 84 as would be the case if the unit 83 was mounted, for example, at the top of a mast or a somewhat flexible pole or the like and the unit 84 was immovably mounted below or in spaced relation with unit 83 as illustrated.

In order to simplify the description of the device of FIG. 7, it will first be assumed that the target 87 is stationary and that there is no relative movement between said target and the unit 84 while there may be deflections or relative movement between the unit 83 and unit 84 which will require automatic adjustment of the prism 86 to cause it to hold its line of sight 85 on the target 87.

The first type of deflection between the unit 83 and unit 84 to be discussed will be that of azimuth which might be caused by a longitudinal twisting movement of the mast or pole supporting the unit 83. This azimuth deflection is detected and compensated for by employing the use of an arrangement similar to that shown in FIG. 1 wherein a grid 92 is provided in the platform 93 of the unit 83 and a light source 94, condensing lens 95 and collimating lens 96 is supported as a unit on the platform 93 by a suitable supporting means not shown. The grid 92, light source 94 and lenses 95 and 96 constitute the equivalent of the unit 10 of the device of FIG. 1 and function in an identical manner as will be described. In the unit 84, there is provided in optical alignment with the grid 92, a second grid 97 in a platform 98, an objective lens 99, scanning prism 100 at the side of the platform 98 facing the unit 83 and photosensitive means 101 adjacent the opposite side of the second grid 97. It will be seen that the grid 97, prism 100, lens 99 and photosensitive means 101 constitute the full equivalent of the unit 11 of FIG. 1 and function in an identical manner thereto. Thus, a deflection of the platform 93 in azimuth by a twisting action of its supporting mast or the like will cause the grid 92 to rotate relative to the grid 97 whereby a phase shift will be introduced in the voltages produced by the photosensitive means 101 which when sensed by a phase sensitive motor 102, which is electrically connected to the photosensitive means 101, as indicated by lines 103, will cause the platform 93 to be driven in a direction opposite to that of the twisting, an amount to counteract the twisting action and maintain the initial alignment of the grids 92 and 97. A detailed description of the operation and function of the apparatus just described can be had by referring to the description of the device of FIG. 1 which as stated above is the equivalent of said apparatus.

Having provided means for sensing and compensating for twisting of the platform 93 relative to the platform 98 to maintain the azimuth direction of the prism 86 accurately aligned with the target 87, means is provided for maintaining the elevation of the prism 86 properly and consistently aligned relative to the target.

It is pointed out that changes in elevation may come about from a sidewise flexing of the mast or the like which will produce a tilting of the platform 93 relative to the platform 98. This sway or tilting of the platform may take place in either of two meridians 103 and 104 which intersect each other at the center of the platform 93 and are in normal relation to each other. It is also to be understood that motions in all other meridians which pass through the intersection of the meridians 103 and 104 may also take place. However, it can be seen that these other motions would be combinations of the two basic motions which take place along meridians 103 and 104 and would be compensated for in a manner to be presently described.

Tilting of the platform 93 relative to platform 95 which takes place along the meridian 103 and effects the "aiming" direction of the prism 86, will be compensated and corrected for by a system which embodies a grid 105, light source 106 and condensing and collimating lenses 107 and 108 respectively in the unit 83. The elements 105, 106, 107 and 108 constitute the full equivalent of the unit 43 of FIG. 5 and function in an identical manner to said unit 43. At the receiving platform 98 of unit 84, there is provided a grid 109, scanning prism 110, imaging or objective lens 111 and photosensitive element 112 which constitutes the full equivalent of the unit 44 of FIG. 5 and is identical in function to said unit 44.

It can be seen that the grid 105 is positioned with its grid lines 105a disposed in a direction parallel to the meridian 104 so that tilting of the platform about an axis parallel to meridian 104 will cause the grid lines 105a to shift transversely relative to the grid lines 109a of the grid 109 and cause a phase shift between the voltage produced by the photosensitive element 112 and a standard voltage produced by a tachometer or the like 113 on the prism drive motor 114. By feeding the electrical signals from the tachometer 113 and the photosensitive element 112 by electrical leads 115 to a conventional phase sensitive type of motor 116 which will operate only when the signals are out of phase with each other, the grid 105 which is fixed to a shaft 117 directly connected to the prism 86, will be adjusted an amount to compensate for the abovementioned tilting. Thus, the signals in leads 115 will be maintained in phase with each other. A detailed description of the operation and function of the system embodying grids 105 and 109 and their associated parts may be had by referring back to the description of the device of FIG. 5 which is identical in operation and function.

The drive connection between motor 116 and grid 105 includes a gear 118 on the drive shaft of motor 116 which is in mesh with a ring gear 119 in driving relation with another gear 120 at the lower end of a shaft 121 having a worm gear 122 at its uppermost end. The worm gear 122 drives a worm follower 123 which, in turn, drives the shaft 117 upon which is secured the prism 86 and grid 105 as described above.

It can then be seen that tilting of the platform 93 about an axis parallel to meridian 104 will cause the prism 86 to automatically be adjusted an amount in accordance with said tilting so as to maintain the "line-of-sight" 85 of prism 86 accurately directed toward the target 87.

Still assuming that the target 87 is stationary relative to the unit 84 a third control system is provided in the device of FIG. 7 which embodies in the unit 83 a light source 124, condensing lens 125, grid 126 and collimating lens 127. In the unit 84 of FIG. 7 there is provided an imaging or objective lens 128, scanning prism 129, grid 130 and photosensitive element 131. This third control system is identical to the system including grids 105 and 109 and is similar in operation and function to said system and to the device illustrated in FIG. 5. The third control system embodying grids 126 and 130 functions to compensate and correct the adjustment of prism 86 for tilting about an axis parallel to meridian 103. Accordingly, the grid lines 126a of grid 126 and grid lines 130a of grid 130 are disposed in directions normal to the meridian 104 as illustrated.

It can be seen that tilting of the platform 93 about an axis parallel to meridian 103 as might result from the sidewise flexing or swaying of the mast or the like in a direction along meridian 104 will introduce a compound motion to the prism 86 which motion will require corrections both in azimuth and elevation to maintain the "line-of-sight" 85 of the prism 86 on the target 87.

Figure 8:
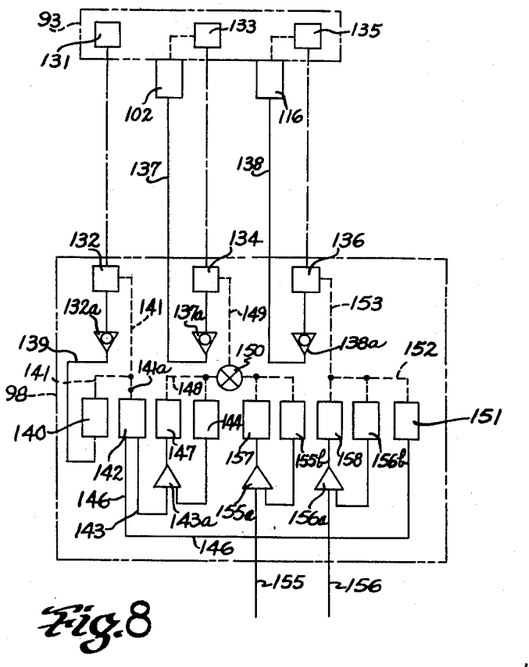
FIG. 8 is a block diagram which schematically illustrates an operating network for the device of FIG. 7.

A change in the phase of the voltage which is produced by the photosensitive element 131 due to movement of grid 126 relative to grid 130 in said direction 104 will then be utilized in a network such as shown in the block diagram of FIG. 8 which provides for an approximate solution to introduce a correction in the azimuth aiming direction through azimuth drive motor 102. While it would also be possible to introduce the proper correcting function to the elevation aiming direction through the drive motor 116 which will hereinafter be referred to as the elevation drive motor, the block diagram shown in FIGURE 8 provides a reasonably accurate solution assuming the sidewise flexing of the mast is relatively small. The derivation of the mathematics for the coordinate conversion between two gimbal systems is well-known and the arrangement of the components shown in FIGURE 8 resembles that used in coordinate conversion problems such as in the introduction of aircraft or ships pitch, roll and yaw corrections to optical tracking instruments or stable platforms used in connection with navigation, fire control, bomb direction and reconnaissance systems.

While still considering that there is no relative motion between the target 87 and the device of FIG. 7 and that only relative movement between the platform 93 of unit 83 and the platform 98 of unit 84 need be compensated for, the operation of the network shown in FIG. 8 is as follows:

The block 131 represents the grid 126 and its associated optical elements and the block 132 represents the grid 130 and its associated optical and electrical elements; the block 133 represents the grid 92 and its associated optical elements and the block 134 represents the grid 97 and its associated optical and electrical elements; and the block 135 represents the grid 105 and its associated optical elements and the block 136 represents grid 109 and its associated optical and electrical elements.

An optical signal received at 134 from 133 which indicates a requirement for a correction in azimuth is amplified at 137a and fed directly to motor 102 as shown by electrical connections 137 whereupon, as described above, the platform 93 is rotatably adjusted to introduce said correction. The orientation of block 134 in azimuth is established from input signal 155 which is amplified at 155a and nulled against that of a pick-off unit 155b to convert to a mechanical motion by means of motor 157. Tilting of the platform 93 only in the direction of the meridian 103 will cause a signal received at 136 to be amplified at 138a and fed directly to motor 116 by electrical connections 138 whereby the "line-of-sight" of the prism 86 will be adjusted an amount sufficient to maintain said "line-of-sight" of the prism on the target 87. The elevation angle represented by the position of the grid in 136 is established from input signal 156 which is amplified at 156a and nulled against that produced by a pick-off unit 156b to provide movement of mechanical connection 152 by means of motor 158.

Error signals of cross level due to the tilting of platform 93 in the direction of the meridian 104 about an axis parallel to meridian 103 must be corrected by rotation of platform 93 to provide an undeviated "line-of-sight" 85. The signal received at 132 is amplified at 132a and fed electrically through a lead 139 to a suitable follow-up motor 140 and the motor 140, in turn, acts to null the error signal by means of its mechanical connection 141 with 132. A second mechanical connection 141a is provided between the motor 140 and a suitable pick-off 142 which is adapted to convert the mechanical position produced by said mechanical connection into an electrical signal which is proportional to the tangent of the sidewise tilt angle. The signal will then be conducted through lead 143 to a servo amplifier 143a which drives the motor 147. The voltage which supplies pick-off 142 is derived from pick-off 151 which is driven by the elevation follow-up motor 158 through the mechanical connection 152 previously described. The voltage produced at lead 146 is proportional to the tangent of the elevation angle and pick-off 151 may be a function wound potentiometer or equivalent device to produce this function. Pick-off 142 produces a signal in lead 143 which is proportional to the tangent of the side sway angle multiplied by its input voltage from lead 146 and the resulting signal produced in lead 143 is proportional to the tangent of the desired correcting angle. Pick-off 144 produces the desired signal proportional to the tangent of the desired azimuth correction which is produced at mechanical connection 148 and the signals from 144 and from 142 are nulled by the servo 143a operating to drive motor 147.

The movement of the mechanical connection 148 is added to that produced by movement of the azimuth input produced by motor 157, as previously described, by the use of a mechanical differential 150. The resulting mechanical movement is conducted by mechanical connection 149 to block 134 where it operates to rotate the grid 97 therein. The grid 97 rotation produces an electrical signal in lead 137 which is amplified at 137a and will operate motor 102 and thus rotate platform 93 in accordance with the signal originally produced at 132 and 136 and the input azimuth signal 155.

It can be seen then, that the signal at 132 will pass through the above-described circuit and mechanical connections to operate motor 102 to compensate and correct for any tilting of the platform in the direction of the meridian 104 so as to cause the "line-of-sight" 85 of the prism 86 to be directed to the target 87 at all times.

Various combinations of the above-described basic movements in azimuth, elevation and cross level, which would be brought about by deflections of a mast or the like supporting the platform 93, will, of course occur under normal conditions and with the above-described electro-optical mechanisms in operation, the "line-of-sight" of the prism 86 will at all times be accurately directed toward the target 87.

In more complex cases where the target 87 is moving relative to the device of FIG. 7 while at the same time deflections of the platform 93 relative to the platform 98 are taking place, the signals which are computed for azimuth and elevation corrections in accordance with the relative movement between the target 87 and the device of FIG. 7 are fed into the network of FIG. 8 by leads 155 and 156.

The signals which are fed through leads 155 and 156 are derived from conventional tracking and stabilization mechanisms 92 (FIG. 7), which function cooperatively with the conventional optical receiving system 91 to produce the electrical information required to maintain the prism "line-of-sight" 85 on the target 87.

By combining the signals passing through leads 155 and 156 with the above-discussed signals produced by deflections of the platform 93 to null out the errors introduced by the mast deflections in the manner diagrammatically illustrated in FIG. 8, an electrical signal designating a change in azimuth which is fed through lead 155 will operate a motor 157 (FIGS. 7 and 8) to rotate the platform 98 which, in turn, will cause the lines of the grids 97 and 92 to become angularly related with each other and introduce a signal through leads 103 to motor 102 and thus cause the platform 93 to simultaneously follow the platform 98.

An electrical signal for elevation directed through lead 156 will drive a motor 158 which is mechanically connected by 153 to the block 136 so as to adjust the grid 109 therein relative to grid 105 in block 135 and thus introduce an electrical signal in leads 115 to operate motor 116 and elevate or depress the "line-of-sight" of the prism 86 in the manner discussed in detail hereinabove.

It can now be seen that motions in azimuth, elevation and cross level which are due either to changing input signals 155 and 156 or to deflections of the platform 93 relative to platform 98 are all instrumented by the network of FIG. 8 to maintain the desired "aim" direction of the prism 86.

From the foregoing, it will be seen that means and method have been provided for accomplishing all the objects and advantages of the invention. Nevertheless, it is apparent that many changes in the details of construction, arrangement of parts or steps of the method may be made without departing from the spirit of the Having described our invention, we claim:

1. Apparatus of the character described comprising a pair of spaced operating units, one of said units embodying a first rotatable grid member, means for rotating said grid member about an axis extending therethrough, a light source and optical means for forming an optical image of said grid member and directing said image along said axis, the other of said units embodying optical means aligned with said axis for receiving said image and focusing the same at a predetermined image plane, a second rotatable grid member similar in character to said first grid member at said image plane for receiving said image and permitting only selected portions thereof to pass through the same, means for causing said image to repeatedly scan said second grid member, means adjacent said second grid member for receiving said portions of said image and converting the same into electrical energy which is characterized by said portions of said image received thereby and means for adjusting at least one of said grid members in accordance with the characteristics of said electrical energy to cause said members to assume a predetermined aligned relation with each other.

2. Apparatus of the character described comprising a pair of spaced operating units, one of said units embodying a rotatable grid member, means for rotating said grid member about an axis extending centrally therethrough, a light source and optical means for forming an optical image of said grid member and directing said image along said axis, the other of said units embodying optical means aligned with said axis for receiving said image and focusing the same at a predetermined image plane which intersects said axis, an opaque rotatable member having a slit extending thereacross in intersecting relation with said axis, said opaque member being located at said image plane for receiving said image and permitting only selected portions thereof to pass through said slit, means for causing said image to repeatedly scan transversely across said slit, means adjacent said rotatable opaque member for receiving said portions of said image which pass through said slit and converting the same into electrical energy which is characterized by said portions of said image received thereby and means for rotatably adjusting said members relative to each other in accordance with the characteristics of said electrical energy to cause said members to assume a predetermined aligned relation with each other.

3. Apparatus for electro-optically duplicating at one location, motion which is produced at another remote location comprising a pair of operating units, one at each of said locations, one of said units embodying a rotatable grid member having a plurality of substantially equally spaced alternate opaque and transparent lines, means for projecting light through said grid to form an image thereof and means for directing said image along a predetermined optical axis, the other of said units embodying optical means for receiving said grid image and focusing the same in a plane intersecting said axis, rotatable light intercepting means at said plane having at least one transparent slit thereacross which is adapted to permit certain portions of said image to pass therethrough in accordance with the relative angular relationships of said grid lines and said slit, means for causing said image to scan across said slit at a predetermined rate, means for receiving said portions of said image which pass through said slit and converting said image portions into electrical energy which is frequency modulated in accordance with the rate of said scanning and frequency phase shifted in accordance with the angular relationship of said grid lines and slit and means for adjusting the angular relationship of said grid lines and slit in accordance with the phase shifted characteristics of said electrical energy.

4. Apparatus for electro-optically duplicating at one location, motion which is produced at another remote location comprising a pair of operating units, one at each of said locations, one of said units embodying a rotatable first grid member having a plurality of substantially equally spaced alternate opaque and transparent lines, means for projecting light through said grid to form an image thereof and means for directing said image along a predetermined optical axis, the other of said units embodying optical means for receiving said grid image and focusing the same in a plane intersecting said axis, a second rotatable grid member similar in character to said first grid member at said plane for permitting selected portions of said image to pass therethrough in accordance with the relative angular relationships of the lines of said first and second grid members, means for causing said image to scan transversely across said second grid member at a predetermined rate, means for receiving said portions of said image which pass through said second grid member and converting the same into electrical energy which is frequency modulated in accordance with the rate of said scanning and frequency phase shifted in accordance with the angular relationship of said grid lines of said first and second grid members and means for adjusting the angular relationship of said grid lines of said grid members in accordance with the phase shifted characteristics of said electrical energy.

5. Apparatus for electro-optically duplicating at one location, motion which is produced at another remote location comprising a pair of operating units, one at each of said locations, one of said units embodying a rotatable grid member having a plurality of substantially equally spaced alternate opaque and transparent lines, means for projecting light through said grid to form an image thereof and means for directing said image along a predetermined optical axis, the other of said units embodying optical means for receiving said grid image and focusing the same in a plane intersecting said axis, rotatable opaque light intercepting means at said plane having a slit thereacross which is adapted to permit portions of said image to pass therethrough in accordance with the relative angular relationships of said grid lines and said slit, means for causing said image to scan transversely across said slit at a predetermined rate, means for receiving said image light which passes through said slit and converting said light into electrical energy which is frequently modulated in accordance with the rate of said scanning and characteristically frequency phase shifted in accordance with the angular relationship of said grid lines and slit and means for adjusting the angular relationship of said grid lines and slit in accordance with the phase shifted characteristics of said electrical energy.

6. An electro-optical system of the character described comprising a pair of spaced operating units in optically axially aligned relation with each other, adjustable optical means in a first of said units for receiving light from a target and directing said light into said system, means for maintaining said optical means in predetermined aligned relation with said target embodying a plurality of adjustable first grid members in said first of said units, means for projecting light through each of said grid members to form optical images thereof and optical means for projecting said images individually away from said first unit along separate axes, means in the second of said units for receiving said images and focusing the same in planes intersecting said axes, a plurality of adjustable second grid members each respectively located at said planes for receiving said images and permitting predetermined portions of their respective images to pass therethrough in accordance with the relative angular relationship of each of said second grid members with their respective axially aligned first grid members, means for causing each of said images to scan their respective second grid members at predetermined rates, means adjacent each of said second grid members for receiving said portions of said images projected therethrough and converting the same into electrical energy which is characteristically frequency modulated in accordance with the rate at which said second grid members are scanned by the respective images, said electrical energy also being characteristically frequency phase shifted in accordance with the angular relationship between said grid lines of each of the respective axially aligned first and second grid members, means for adjusting said first and second grid members relative to each other in accordance with said phase shifted characteristics of said energy to cause said first and second grid members to assume predetermined aligned relationships with each other whereby angular misalignment of said grid members will be detected by said characteristic phase shifting of said energy and electro-mechanical means associated with the means for adjusting each of said first grid members and said adjustable optical means to move said adjustable optical means in accordance with said adjustments of said first grid members to maintain said adjustable optical means aligned with said target.

7. An electro-optical system of the character described comprising a pair of spaced operating units in optically axially aligned relation with each other, adjustable optical means in a first of said units for receiving light from a target and directing said light into said system, means for maintaining said optical means in predetermined aligned relation with said target embodying a plurality of adjustable first light modulating members, means for projecting light through each of said light modulating members to form individual optical images thereof, a plurality of adjustable second light modulating members in said second of said units for receiving said images and permitting predetermined portions thereof to pass through said second light modulating means whereby said portions of said images will be characterized by the relative positions of said light modulating members in each of said units, means for interpreting characteristic changes in said portions of said images and means for adjusting said first and second light modulating members relative to each other in accordance with said characteristic changes to cause said first and second light modulating members to assume predetermined relationships with each other, electro-mechanical means associated with the means for adjusting said first light-modulating members and said adjustable optical means to move said adjustable optical means in accordance with said adjustments of said first light-modulating members to maintain said adjustable optical means aligned with said target.

8. The method of duplicating at one location, motion which is produced at another location comprising producing an optical image at one of said locations and projecting the same along a predetermined optical path, focusing said image in a plane at the other of said locations, causing said image to scan said plane at a predetermined rate, providing means in said plane for permitting selected portions of said image to pass through said plane, said portions of said image being characteristically changed in accordance with changes in the relative positions of said means and image, electrically interpreting characteristic changes in said selected portions of said image and electromechanically adjusting the relative positions of said means and image in accordance with said characteristic changes in said selected portions of said image.

9. The method of duplicating at one location, motion which is produced at another location comprising producing a grid-like optical image at one of said locations and projecting the same along a predetermined optical path, focusing said image in a plane at the other of said locations, causing said image to scan said plane at a predetermined rate, providing means in said plane for permitting selected portions of said image to pass through said plane, converting said portions of said image into electrical energy having an alternating frequency controlled in accordance with said rate of scanning and having its phase shifted in accordance with the relative positions of said means and said grid-like image, and adjusting the relative positions of said means and image to introduce interpretable phase changes in said electrical energy and from which alignment of said means with said image may be accomplished.

10. The method of following-up at one location, motion which is produced at another remote location comprising modulating light at one of said locations and projecting said modulated light along a predetermined optical path, focusing said modulated light in a plane at the other of said locations, causing said modulated light to scan said plane at a predetermined rate, providing means for permitting selected portions of said modulated light to pass through said plane, converting said portions of said modulated light into electrical energy having an alternating frequency controlled in accordance with said rate of scanning of said light in said plane and having its phase characterized in accordance with the positional relationships of said means and said modulated light at said one of said locations, and adjusting said positional relationship of said means and modulated light in accordance with said phase characteristics of said electrical energy.

11. The method of duplicating at one location, motion which is produced at another location comprising modulating light at one of said locations and projecting said modulated light along a predetermined optical path, focusing said modulated light in a plane at the other of said locations, causing said modulated light to scan said plane at a predetermined rate, providing means for permitting selected portions of said modulated light to pass through said plane, said portions of said modulated light being characteristically changed in accordance with changes in the relative positions of said means and the modulated light at said one of the locations, electrically interpreting characteristic changes in said portions of said modulated light and electro-mechanically adjusting the relative positions of said means and the modulated light at said one of the locations in accordance with said characteristic changes in said portions of said modulated light.

12. Apparatus of the character described comprising a pair of spaced units, one of said units embodying a light-modulating member and means for producing an optical image of said light-modulating member, the other of said units embodying means for receiving said image of said light-modulating member and including a partially transparent member for permitting portions of said image to pass therethrough, at least one of said members being movable relative to the other thereof to bring about a characteristic change in the portions of the image transmitted through said partially transparent member, means for causing said image to repeatedly continuously scan said partially transparent member at a predetermined rate, means for receiving said transmitted portions of said image and converting the same into electrical energy which is characterized by said rate of scanning and by said changes in said transmitted portions of the image as received by said receiving and converting means, and means for bringing about movement of one of said members relative to the other to alter the positional relationships of said members in accordance with the characteristics of said electrical energy and to cause said members to assume a predetermined aligned relation with each other.

13. Apparatus of the character described comprising a pair of spaced operating units, one of said units embodying a movable light-modulating member, means for moving said light-modulating member, means for forming an optical image of said light-modulating member and directing said image along a predetermined optical axis, the other of said units embodying optical means aligned with said axis for receiving said image and focusing the same at a predetermined image plane, a movable receiving member at said image plane for receiving said image and having a transparent area of pre-controlled shape for permitting only selected portions of said image to pass through the same, means for causing said image to repeatedly scan the transparent area of said receiving member at a pre-controlled rate, means adjacent said receiving member which is adapted to receive said portions of said image which pass through said receiving member and convert the same into electrical energy which is characterized by said rate of scanning and the relative positions of said movable members, and means for adjusting at least one of said members in accordance with the characteristics of said electrical energy to cause said members to assume a predetermined aligned relation with each other.

14. Apparatus of the character described comprising at one of a pair of spaced locations, means for forming a grid-like optical image and projecting the same along a predetermined optical axis and means for moving said image relative to said axis, means for receiving said image at the other of said locations including a partially transparent member and focusing means for focusing said optical image on said partially transparent member, said partially transparent member being movable relative to said optical axis, means for causing said image to scan across said partially transparent member whereby light forming said image will pass through said partially transparent member, means for receiving said light after passing through said partially transparent member and converting the same to electrical energy having an alternating frequency controlled in accordance with the rate of scanning of said grid image and having its phase shifted in accordance with the relative positions of said partially transparent member and said grid image whereby rotation of said grid image relative to said partially transparent member will introduce interpretable phase changes in said electrical energy from which alignment of said grid image with said transmitting means may be accomplished.

15. Apparatus of the character described comprising a pair of spaced units, one of said units embodying a source of light, a light-modulating member having opaque and transparent portions, means for focusing light from said source onto said light-modulating member, means for projecting light modulated by said member along a controlled path to the other of said units in the form of an image of said light modulating member, a member in said controlled path of light having a transparent area of precontrolled shape through which portions of said image are directed, said members being movable relative to each other to vary the characteristics of the light transmitted through said transparent area, means for receiving and electrically interpreting characteristic changes in said transmitted portions of said light which are brought about by relative movement between said members and means for adjusting the relative positions of said members in accordance with said electrical interpretations of said characteristic changes in said transmitted portions of said light to cause said members to assume a predetermined aligned relation with each other.

References Cited in the file of this patent
UNITED STATES PATENTS

| | | |
|---|---|---|
| 2,167,484 | Berry | July 25, 1939 |
| 2,375,665 | Koulicovitch | May 8, 1945 |
| 2,447,344 | Kliever | Aug. 17, 1948 |
| 2,513,367 | Scott | July 4, 1950 |
| 2,857,798 | Seliger | Oct. 28, 1958 |
| 2,877,354 | Fairbanks | Mar. 10, 1959 |